United States Patent Office 3,206,511
Patented Sept. 14, 1965

3,206,511
NON-IONOGENIC POLYAMINE ETHER CAPILLARY ACTIVE COMPOUNDS
Jakob Bindler and Rudolf Keller, Riehen, near Basel, Switzerland, assignors to Geigy Chemical Corporation, Ardsley, N.Y., a corporation of Delaware
No Drawing. Filed July 7, 1960, Ser. No. 41,262
Claims priority, application Switzerland, July 8, 1959, 75,479/59
8 Claims. (Cl. 260—570.6)

The present invention concerns new capillary active substances which are very valuable in particular as auxiliary products in textile dyeing. The invention also concerns processes for the production of such compounds as well as the use of these new capillary active substances as auxiliary products in the treatment of textiles.

It has been found that valuable non-ionogenic, capillary active compounds are obtained if a polyamine having at least 2 but advantageously not more than 4 basic nitrogen atoms and at least one lipophilic radical and at least one hydrogen atom bound to the basic nitrogen atoms, is reacted first with an equimolecular amount of styrene oxide and then, in any order desired, with at least 50 mols of low molecular alkylene oxide and at most with as many further mols of styrene oxide as correspond to the number of hydrogen atoms originally bound to the basic nitrogen atoms. In the polyamine used, the basic nitrogen atoms are bound by bridging members which consist of saturated low hydrocarbon radicals which, in the direct chain linking the basic nitrogen atoms, possibly also contain oxygen as linking members, the hetero atoms of the direct chain being separated by at most 3 carbon atoms.

The compounds obtained by this process correspond to the general formula

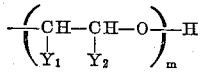

(I)

wherein
L represents a lipophilic organic radical, advantageously an alkyl radical having at least 16 carbon atoms,
$A_1$ and $A_2$ each represent a saturated hydrocarbon radical having at most 6 carbon atoms of which at most 3 carbon atoms bind the hetero atoms in a direct chain,
X represents oxygen or an

group,
n represents a low whole number, and
$R_1$, $R_2$, $R_3$ and $R_4$ each represent a radical of the Formula II

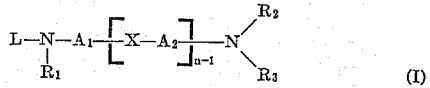

(II)

In one of the first of the multiple bridging members

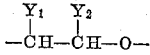

of the radicals R according to Formula II, of $Y_1$ and $Y_2$ the one Y is hydrogen and the other Y is phenyl; in the other multiple bridging members the one Y is hydrogen and the other Y is hydrogen or methyl and only at most once in each chain is it phenyl. $m_1$, $m_2$, $m_3$ and $m_4$ represent whole numbers the sum of which is at least 51 and, advantageously at least 70.

Thus a phenethylene radical is bound direct to one of the basic nitrogen atoms whilst other phenethylene radicals possibly present are at any distance desired from a basic nitrogen atom, i.e. they occur either as a middle component or as an end component in one of the chains

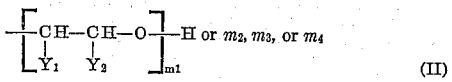

The lipophilic organic radical is chiefly a higher molecular hydrocarbon radical. This should have at least an alkyl radical of 16 or more carbon atoms bound either direct or by way of an aryl, aralkyl or oxalkyl radical to one of the basic nitrogen atoms. Advantageously the substances according to the invention are derived from polyamines which have an alkyl radical of 16 to 18 carbon atoms.

1.2-ethane, 1.2-propane, 1.2- or 2.3-butane radicals, of these chiefly the 1.2-ethylene and 1.2-propylene radicals, are the preferred bridging members. Also more of these radicals being linked by means of oxygen can form the bridging members linking the basic nitrogen atoms but at most there should be only 3 oxygen atoms in the direct chain. The chain can also consist, for example, of the bis-ethylene oxide, a bis-propylene oxide, the bis-ethyleneoxyethane radical or a bis-propyleneoxyethane radical, but also a 1.2 cyclohexane radical can form a bridging member or be a component of one.

Polyamines used according to the present invention are, for example $N_1$-hexadecylethylenediamine, $N_1$-octadecylethylenediamine, $N_1$-hexadecyl- or $N_1$-octadecyl-propylenediamine, $N_1$-hexadecyl- or $N_1$-octadecyl-diethylenetriamine, $N_1$-hexadecyl- or $N_1$-octadecyl-triethylenetetramine, $N_1$-hexadecyl- or $N_1$-octadecyl-diaminoethyl ether, $N_1$-hexadecyl- or $N_1$-octadecyl-diaminoethyl glycol ether, also, however, corresponding compounds having another lipophilic radical, for example the dodecylbenzyl radical. Naturally, mixtures of these compounds can be used, for example, isomeric mixtures which differ with regard to the position of the lipophilic radical, or mixtures which differ in a given structure only by different lipophilic alkyl radicals; however the saturated alkyl radicals with 16–18 carbon atoms should predominate. Advantageously, polyamines used according to the invention should also contain one primary amino group.

The polyamines mentioned and others used according to the invention are obtained, for example, from diprimary or diprimary-secondary or diprimary-tertiary alkylene polyamines and from diprimary of diprimary-secondary or diprimary-tertiary di- or triethers by condensing in the warm with an at most equimolecular amount of alkyl, alkylbenzyl, cycloalkyl or alkylcycloalkyl chlorides or bromides or of alkali metal salts of acid sulphates of the corresponding hydroxyl compounds. After liberating the bases obtained with strong alkalies, any more easily volatile components still present are distilled off, advantageously in vacuo, and the mixture of bases which is not easily volatile is used direct for the condensation with styrene oxide.

These starting materials which advantageously contain one primary amino group and, in all, at least 2 but advantageously not more than 4 basic nitrogen atoms, are reacted, according to the invention, first with an equimolecular amount of styrene oxide. In this reaction an amino group, particularly easily a primary amino group, is substituted by the β-hydroxyphenethyl radical, probably by the β-hydroxy-β-phenylethyl radical. The reaction product is then reacted with a low molecular alkylene oxide, in particular with ethylene oxide or propylene oxide or with mixtures of the two, in such amounts and under such conditions that at least 50, in particular in all 70 to 100 alkyleneoxy radicals are introduced. Depending on the desired properties of the end products, it is often advantageous if certain proportions of ethylene oxide and proplyene oxide are reacted simultaneously or one after the other with the styrene oxide-polyamine condensation products. The condensation products which contain at least 50 and advantageously more than 70 ethyleneoxy radicals and have a low content of propyleneoxy radicals are generally still sufficiently water soluble for direct use for the purposes intended. It is often advantageous for an intended use of the condensation products according to the invention if they contain more than one phenylethyleneoxy radical. It is possible, without difficulty, at any stage, i.e. before, during or after the reaction with alkylene oxide, to add single equivalents of styrene oxide. However, in order to attain sufficient water solubility, it is indicated to limit the number of phenylethyleneoxy groups incorporated. This number should not be greater than the number of hydrogen atoms bound direct to basic nitrogen atoms in the starting material. Advantageously, in all there should not be more than three such groups.

The epoxides are added under the usual conditions. Whereas for the addition of styrene oxide in the first step it is generally sufficient to react the component by heating to about 100° C. to 200° C. depending on the composition, generally a basic catalyst such as sodium or potassium hydroxide, carbonate or alcoholate, is necessary for the addition of the alkylene oxides. Depending on their reactivity, the alkylene oxides can be incorporated in the solutions of the starting materials and catalysts in inert organic solvents, or in the melts of the starting materials, if necessary under pressure. In general, raised temperatures of, for example 80° C. up to about 200° C. are indicated.

By adapting the proportions of the components to the intended use it is possible to produce end products with the most varied properties, i.e. auxiliary products for different purposes and types of application.

More specifically valuable non-ionogenic capillary active ethers according to the present invention are obtained by reacting 1 mol of a polyamine of the general formula

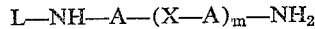

L—NH—A—(X—A)$_m$—NH$_2$ wherein
L represents a lipophilic alkyl radical having 16–18 carbon atoms,
A represents an alkylene radical selected from the group consisting of —CH$_2$—CH$_2$— and

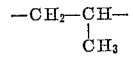

—CH$_2$—CH—
       |
       CH$_3$ radicals,
X represents a member selected from the group consisting of —NH— and —O—, and
m represents one of the numbers 0 to 2, first with 1 mol of styrene oxide and then in any order desired with 50 to 150 mols of ethylene oxide and 0 to 2 mols of an oxide selected from the group consisting of styrene oxide and propylene oxide.

A particularly valuable class of ether is obtained by reacting 1 mol of a polyamine of the general formula

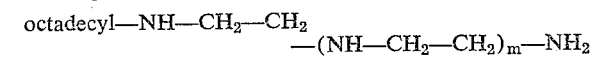

octadecyl—NH—CH$_2$—CH$_2$—(NH—CH$_2$—CH$_2$)$_m$—NH$_2$ wherein m represents one of the numbers 0 to 2, first with 1 to 2 mols of styrene oxide and then with 70 to 100 mols of ethylene oxide.

In particular, as water soluble non-ionogenic and uncoloured or only weakly coloured capillary active substances, the compounds according to the invention are valuable textile auxiliary products. They can also be used, however, for example as dispersing agents for solid substances such as, e.g. fats, oils, waxes and resins, tannins, pigments. They are particularly valuable as dyeing auxiliaries particularly when they contain 70–100 glycol ether groups.

An advantage of the new compounds when compared with known, similar substances containing more than one basic N atom and having no phenethyl radical bound to a basic nitrogen atom, the slight tendency to foaming in aqueous solution or considerably less stability of the foam formed is to be stressed. This property is particularly pronounced if still further phenethyl groups are incorporated into the molecule, in particular when the end group of a chain is a hydroxyphenethyl radical. Because of this property, the new substances are particularly suitable as textile auxiliaries in cases where foam formation in agitated liquors is undesirable, such as, e.g. in dyeing apparatus.

The new substances are used advantageously, for example, on dyeing textiles with those dyestuffs which, under otherwise desirable dyeing conditions, have too great an affinity for the fibre or a too limited solubility and thus produce uneven dyeings. By the addition of relatively very small amounts of these auxiliary products to the dyebath or by after-treating the dyeings with hot, aqueous solutions of the auxiliaries, the uneven dyeings are prevented or rectified respectively and the fastness to rubbing is improved.

The advantages become particularly apparent on dyeing keratine fibres at the preferred pH values of the dyebaths for these fibres with metal-free or heavy metal-containing so-called neutral drawing dyestuffs which are fast to milling and often have bad levelling powers, in addition on dyeing wool which has been anti-crease processed (generally chlorinated), and also, however, on dyeing cellulose fibres with direct drawing dyestuffs which tend to unevenly penetrate the fibres and produce insufficiently fast to rubbing dyeings.

The following examples illustrate the invention. Where not otherwise expressly stated, parts are given therein as parts by weight. The temperatures are in degrees centigrade. The relationship of parts by weight to parts by volume is as that of grammes to cubic centimetres.

*Example 1*

89 parts of N-stearyldiethylenetriamine produced by known methods from sulphatised stearyl alcohol and diethylenetriamine are melted by heating to 70°. 30 parts of styrene oxide dissolved in toluol are added dropwise to the melt within about 10 minutes. The mixture is then slowly heated to 110°. At this temperature, heat is generated to about 150°. On completion of the reaction, the temperature is kept at 140–150° by warming for about 4 hours. A brown oil is formed which gradually solidifies in the cold.

50.8 parts of the N-stearyldiethylenetriamino-2-phenylethanol obtained as described above are taken up in 50 parts of alcohol in which 1 part of sodium has been dissolved. After thoroughly mixing, the alcohol is distilled off, the mixture is heated to 120–130° and then ethylene oxide is introduced until the increase in weight is 423 parts. The reaction product obtained solidifies on cooling and then completely dissolves in water. It is a valuable levelling agent for wool dyeing and can be used, for example, in the following dyeing process.

100 parts of wool slubbing on tops are thoroughly rinsed in a packing apparatus with a liquor consisting of 2000 parts of 50° warm water, 1 part of 98% sulphuric acid and 0.5 parts of the capillary active compound obtained as described above. Then an aqueous solution of 0.5% (calculated on the goods to be dyed) of dyestuff is added to the liquor. The dyestuff contains one chromium atom, one molecule of the monoazo dyestuff 6-nitro-2-hydroxy - 4 - sulphonaphthalene-(1-azo-1-)-2-hydroxynaphthalene and one molecule of the monoazo dyestuff 2-hydroxy - 5 - benzene-azobenzene-(1-azo-1)-2-hydroxynaphthalene in complex linkage. The dye liquor is brought to the boil within 30 minutes. After a further 40 minutes the bath is well exhausted and its pH value has risen from 5.1 to 5.5. A dark grey dyeing which has good fastness to rubbing and very good wet fastness is obtained. The tops are very evenly penetrated; but on dyeing without the addition of the capillary active compound, rather uneven dyeings are obtained.

The compounds obtained by condensing N-cetyl-diethylenetriamine or N-stearyltriethylenetetramine with styrene oxide and ethylene oxide in the manner described has a similar levelling action.

*Example 2*

91 parts of stearylethylenediamine are heated to 70° and 35 parts of styrene oxide are gradually added at this temperature. The mixture is then heated to 140° whereupon, by the heat generated, the temperature rises to 176°. The reaction mixture is then stirred for another 4–5 hours to about 140°. 2 parts of sodium ethylate are then added to the melt and ethylene oxide is introduced at a temperature of 110–120° until the increase in weight is 900 parts.

After cooling, a solid compound which dissolves well in water is obtained. It can be used as levelling agent on dyeing wool with acid dyestuffs. For this purpose, for example, 100 parts of woolen knitting yarn in hanks are entered, in the hank dyeing machine, into a liquor which consists of 3300 parts of 45° warm water, 5 parts of 40% acetic acid and 0.5 part of the capillary active compound produced by the above process. The dye goods are well wetted for 15 minutes by circulating the liquor, after which they are removed from the bath and an aqueous solution of the dyestuff is added. As such is used, for example, 0.5% (calculated on the weight of the fibres) of the complex chromium compound consisting of 1 chromium atom, 1 molecule of the monazo dyestuff 2-hydroxy-4-sulphonaphthalene-(1-azo-1)-2-hydroxynaphthalene and 1 molecule of the monazo dyestuff 2-hydroxy-4-nitro-benzene-(1-azo-1)-2-hydroxynaphthalene. The goods are again entered into the dyebath, the liquor is brought to the boil within 30 minutes and kept for about 40 minutes at the boil. During the dyeing process the pH value of the liquor rises from 4.5 to 4.7. Very evenly penetrated knitting yarns of a dark grey colour are obtained. The dyeings have very good fastness to wet and good fastness to rubbing.

The compound obtained by condensing N-stearyl-1.2-diaminopropane with styrene oxide and ethylene oxide in the manner described has a similar levelling action.

*Example 3*

92 parts of N-stearlydiethylenetriamine are melted by heating to 70–80°. 62 parts of styrene oxide are then added to the melt and the whole is heated while stirring at 120°. Heat is then generated and the temperature of the reaction mixture rises to 186°. After cooling to 140–150° the mixture is stirred for about 5 hours at this temperature. Analysis shows that the reaction product obtained is $N_1$-stearyl-$N_2.N_3$-bis-($\beta$-phenylhydroxyethyl)-diethylenetriamine. A solution of 2.3 parts of sodium in 100 parts of alcohol is then added to the reaction mixture. After mixing well, the alcohol is distilled off and 1023 parts of ethylene oxide is introduced into the melt at a temperature of 110–120°. On cooling, the reaction mixture solidifies into an almost colourless mass. The product dissolves well in water and foams very little in aqueous solution. It can be used as a levelling agent, for example, as described below.

A so-called packing apparatus is prepared with 100 parts of woollen worsted yarn and 2200 parts of 50° warm water. To circulate the liquor the pump is then set in motion and first 3 parts of ammonium sulphate and then 0.3 part of the capillary active compound produced as described above are added to the dye bath. After thoroughly wetting the dye goods, a concentrated aqueous solution of the dyestuff is added. As such is used, for example, the complex chromium compound of the disazo dyestuff obtained from diazotised 4-amino-3-hydroxyazobenzene-3'-sulphonic acid and 2-hydroxynaphthalene. 0.5% (calculated on the weight of the fibres) of dyestuff is added. Dyeing is then performed as described in Example 1. The brown-coloured wool material is very evenly penetrated.

The product obtained by reacting 1 mol of N-stearyldiethylentriamino-2-phenylethanol first with 10 mols of ethylene oxide, then with 1 mol of styrene oxide and again with 80 mols of ethylene oxide under conditions as described in the first paragraph of this example also has a good levelling action.

*Example 4*

47.5 parts of N-stearyldiethylenetriamino-2-phenylethanol obtained according to Example 1 and 1 part of sodium ethylate are treated with 44 parts of ethylene oxide at 140–150°. The reaction product is then reacted at the same temperature with 12 parts of styrene oxide, then with 88 parts of ethylene oxide, again with 12 parts of styrene oxide and finally with 264 parts of ethylene oxide. The water soluble product obtained can be used as levelling agent in wool dyeing. As it only foams very slightly it is a particularly valuable auxiliary in particular on dyeing in apparatus having a circulating liquor.

0.5 part thereof is used, for example, in a dye liquor containing 220 parts of 50° warm water, 2 parts of 40% acetic acid and 0.5% of dyestuff (calculated on the weight of the fibres). The dyestuff is the coupling product of tetrazotised 1.1-bis-(4'-o-aminobenzenesulphonyloxyphenyl)-cyclohexane with 2 mols of 2-aminonaphthalene-6-sulphonic acid. 100 parts of woollen worsted yarn are dyed in a so-called packing apparatus by the process described in Example 1. The yarn is very uniformly dyed. If, however, dyeing is performed without the addition of the capillary active substance, then an orange dyeing which is considerably less uniformly dyed is obtained.

*Example 5*

40 parts of N-stearyldiaminoethyl glycol ether obtained by condensing stearyl chloride with diaminoethyl glycol ether are reacted at 140–150° with 12 parts of styrene oxide. The mixture is stirred for about 4 hours at this temperature, then 1 part of sodium ethylate is added and then 396 parts of ethylene oxide are added at 110–120°. The reaction is complete after a short time and the product solidifies on cooling. The product can be used, for example, in the dyeing process described below, as levelling agent on dyeing wool with dyestuffs containing sulphonic acid groups.

3000 parts of 50° warm water are prepared in a so-called winch machine, 100 parts of wool cloth are placed on the winch which is then rotated through the liquor and then first 3 parts of 40% acetic acid and then 0.5 part of the capillary active compound obtained by the above process are added. After the goods have been well wetted for 15 minutes an aqueous solution of the dyestuff is added. As such, e.g. 1.5% (calculated on the weight of the fibres) of the coupling product of tetrazotised 1.1-bis-(4'-o-aminobenzenesulphonyloxyphenyl)-cyclohexane and 2-amino-8-hydroxynaphthalene-6-sulphonic acid is used. The dye liquor is then brought to the boil within 40 minutes and kept at the boil for about 50 minutes. The woollen cloth is dyed red very uniformly and the dyeing has good fastness to wet and rubbing.

Wool dyeings which have been produced without the addition of a levelling agent and are uneven can afterwards be levelled out with the aid of the above capillary active compound. For this purpose, the dyed goods are treated in a fresh bath at the boil with a somewhat larger amount of the auxiliary, for example, 1.5 parts per 3000 parts of water after the addition of acetic acid.

*Example 6*

37.2 parts of N-cetyldiaminoethyl glycol ether are reacted first with 12 parts of styrene oxide and then with 350 parts of ethylene oxide under the conditions given in Example 5 for the corresponding octadecyl derivative.

An almost colourless product which dissolves well in water and has a very good levelling action is obtained.

If, for example, the acid wool dyestuff mentioned in Example 4 is used for dyeing rabbit fur hat bodies, then very evenly penetrated hat bodies of a dark orange shade which have very good wet fastness properties and good fastness to rubbing are obtained.

*Example 7*

19.5 parts of styrene oxide are added to 53 parts of $N$-stearyl-1.2-propanediamine obtained by condensing 1 mol of stearyl bromide and 1 mol of 1.2-propanediamine and the mixture is heated to about 140°. As soon as this temperature is attained, a fairly quick exothermic reaction takes place and the temperature rises to about 160°. The reaction mass is then kept for 5 hours at 140–150°. 1.5 parts of sodium ethylate are then added, then 643 parts of ethylene oxide are added at a temperature of 110–120° and the whole is kept for a short time at this temperature.

The reaction product, which solidifies on cooling, has a strong capillary active action and can be used as levelling agent in dyeing processes such as are described in the last or next to last paragraphs of Examples 1 to 6.

*Example 8*

62 parts of the $N_1$-stearyl-$N_2.N_3$-($\beta$-phenylhydroxyethyl)-diethylenetriamine produced according to Example 3 are mixed with 6 parts of propylene oxide and the mixture is slowly heated to 70° to 80°. It is stirred for 2 hours at this temperature and then for a short time at a temperature between 140° and 150°. The temperature is then allowed to drop to 110–120° and 229 parts of ethylene oxide are introduced into the mixture. The reaction product is then allowed to cool whereupon it solidifies.

The new capillary active compound has a clear levelling action on dyeing material containing cellulose fibres with the so-called Direct Dyestuffs. For this purpose, for example, 100 parts of cotton yarn in the form of cheeses are well wetted in a so-called packing apparatus for 15 minutes in a liquor consisting of 2200 parts of 50° warm water, 0.5 part of calcinated soda, 5 parts of calcinated sodium sulphate, 1 part of the capillary active compound and 1% (calculated on the goods to be dyed) of the coppered dyestuff obtained from tetrazotised 3.3'-dimethoxy-4.4'-diaminodiphenyl coupled on the one side with the molar amount of 1-hydroxynaphthalene-3.8-disulphonic acid and on the other side with a molar amount of 2-phenylamino-5-hydroxynaphthalene-7-sulphonic acid. The dye liquor is then heated to 90° within 40 minutes and kept at this temperature for 45 minutes. After dyeing, the cotton yarn is well rinsed. The dyeing is a very uniform deep blue and has good fastness to light.

What we claim is:

1. The non-ionogenic capillary active ethers obtained by reacting 1 mol of a polyamine of the general formula L—NH—A—(X—A)$_m$—NH$_2$ wherein L represents a lipophilic alkyl radical having 16–18 carbon atoms, A represents an alkylene radical selected from the group consisting of —CH$_2$—CH$_2$— and

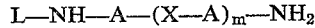

radicals,

X represents a member selected from the group consisting of —NH— and —O—, and $m$ represents one of the numbers 0 to 2, first with 1 to 2 mols of styrene oxide at a temperature of about 100° C. to 200° C., and then with 50 to 150 mols of ethylene oxide at a temperature of 80° C. to about 200° C.

2. The non-ionogenic capillary active ethers obtained by reacting 1 mol of a polyamine of the general formula L—NH—A—(X—A)$_m$—NH$_2$ wherein L represents a lipophilic alkyl radical having 16–18 carbon atoms, A represents an alkylene radical selected from the group consisting of —CH$_2$—CH$_2$—

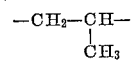

radicals,

X represents a member selected from the group consisting of —NH— and —O—, and $m$ represents one of the numbers 0 to 2, first with 2 mols of styrene oxide at a temperature of about 100° C. to 200° C., and then with 50 to 150 mols of ethylene oxide at a temperature of 80° C. to about 200° C., in the presence in the reaction mixture, at least during the final stage of the reaction, of a catalyst selected from the group consisting of sodium hydroxide, potassium hydroxide, sodium carbonate, potassium carbonate, sodium alcoholate and potassium alcoholate.

3. The non-ionogenic capillary active ethers obtained by reacting 1 mol of a polyamine of the general formula octadecyl-NH—CH$_2$—CH$_2$—(NH—CH$_2$—CH$_2$)$_m$—NH$_2$ wherein $m$ represents one of the numbers 0 to 2, first with 1 to 2 mols of styrene oxide at a temperature of about 100° C. to 200° C., and then with 70 to 100 mols of ethylene oxide at a temperature of 80° C. to about 200° C.

4. The non-ionogenic, capillary active ether obtained by reacting 1 mol $N_1$-octadecyl-diethylenetriamine first with 1 mol of styrene oxide at a temperature of about 100° C. to 200° C., and then with 90 mols of ethylene oxide at a temperature of 80° C. to about 200° C.

5. The non-ionogenic, capillary active ether obtained by reacting 1 mol $N_1$-octadecyl-ethylenediamine first with 1 mol of styrene oxide at a temperature of about 100° C. to 200° C., and then with 70 mols of ethylene oxide at a temperature of 80° C. to about 200° C.

6. The non-ionogenic, capillary active ether obtained by reacting 1 mol $N_1$-octadecyl-diethylenetriamine first with 2 mols of styrene oxide at a temperature of about 100° C. to 200° C., and then with 90 mols of ethylene oxide at a temperature of 80° C. to about 200° C.

7. The non-ionogenic, capillary active ether obtained by reacting 1 mol $N_1$-octadecyl-diethylenetriamine first with 1 mol of styrene oxide at a temperature of about 100° C. to 200° C., and then, at a temperature of 80° C. to about 200° C., with 10 mols of ethylene oxide, with 1 mol styrene oxide, with 20 mols of ethylene oxide, with 1 mol styrene oxide and finally with 60 mols of ethylene oxide.

8. The non-ionogenic, capillary active ether obtained by reacting 1 mol of $N_1$-octadecyl-diethylenetriamine first with 2 mols of styrene oxide at a temperature of about 100° C. to 200° C., and then, at a temperature of 80° C. to about 200° C., with 1 mol propylene oxide and finally with 50 mols of ethylene oxide.

References Cited by the Examiner

UNITED STATES PATENTS

| | | | |
|---|---|---|---|
| 2,576,458 | 11/51 | Hill et al. | |
| 2,759,021 | 8/56 | Garr et al. | 260/570.5 X |
| 2,884,459 | 4/59 | Kirkpatrick et al. | 260—584 |
| 2,930,670 | 3/60 | Bradshaw et al. | 8—85 |
| 2,944,030 | 7/60 | Patton. | |
| 2,953,423 | 9/60 | Buc | 8—85 |
| 2,953,585 | 9/60 | De Groote et al. | 260—404.5 |
| 2,956,067 | 10/60 | De Groote et al. | 260—404.5 |

FOREIGN PATENTS 811,569   4/59   Great Britain.

CHARLES B. PARKER, *Primary Examiner.*

MORRIS O. WOLK, LEON ZITVER, *Examiners.*

UNITED STATES PATENT OFFICE
CERTIFICATE OF CORRECTION

Patent No. 3,206,511                                  September 14, 1965

Jakob Bindler et al.

It is hereby certified that error appears in the above numbered patent requiring correction and that the said Letters Patent should read as corrected below.

Column 8, line 5, after "$-CH_2-CH_2-$" insert -- and --.

Signed and sealed this 19th day of September 1967.

(SEAL)
Attest:

ERNEST W. SWIDER                                          EDWARD J. BRENNER
Attesting Officer                                               Commissioner of Patents